UNITED STATES PATENT OFFICE 2,133,439

MONOAZO DYESTUFFS

Richard Fleischhauer, Frankfort-on-the-Main-Fechenheim, Germany, assignor to General Aniline Works, Inc., New York, N. Y., a corporation of Delaware No Drawing. Application September 30, 1936, Serial No. 103,363. In Germany October 2, 1935

4 Claims. (Cl. 260—163)

This invention relates to valuable new monoazodyestuffs, more particularly to those of the general formula:

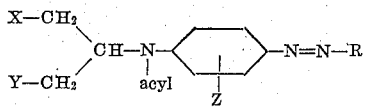

wherein X and Y stand for members selected from the group consisting of hydrogen and methyl acyl stands for an acyl radical and the aliphatic and benzene series, Z stands for a member selected from the group consisting of hydrogen and —SO₃H, and R means the radicle of a coupling component.

The new dyestuffs are obtained by combining the diazo compounds of aromatic amines of the general formula:

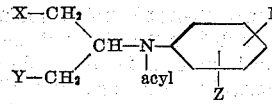

(wherein X, Y and Z have the above signification) with a coupling component.

The diazo components employed for the manufacture of the dyestuffs of this invention have not hitherto been described. They may be obtained for example by acting with 1-chloro-4-nitrobenzene or 1-chloro-4-nitrobenzene-2-sulfonic acid on the corresponding aliphatic amines, if necessary splitting off the sulfonic group, acylating the amino group and reducing the nitro group. Thus, for example, 1-(N-acetyl-isopropyl-amino)-4-aminobenzene may be prepared by heating 1-chloro-4-nitrobenzene-2-sulfonic acid with an excess of isopropylamine in the presence of an aqueous solution of sodium carbonate in an autoclave to about 130° C. for about 30 hours. The resulting 1-isopropylamino-4-nitrobenzene-2-sulfonic acid is then treated with dilute sulfuric acid in an autoclave at about 135° C. for about 20 hours so as to split off the sulfuric acid group. The yield thereof, which is about 85% of the theoretical, is subsequently acylated by heating with acetic anhydride in the presence of a small amount of concentrated sulfuric acid, whereby 1-(N-acetyl-isopropyl-amino)-4-nitrobenzene is formed with a very good yield. Finally the nitro group of this compound is reduced in the usual manner by means of iron and acetic acid and 1-(N-acetyl-isopropyl-amino)-4-aminobenzene is obtained with a yield of about 75%. It crystallizes from benzine in colorless crystals of 117° C. melting point.

In an analogous manner, 1-(N-acetyl-sec-butyl-amino)-4-aminobenzene, 1-(N-benzoyl-isopropyl-amino)-4-aminobenzene, 1-(N-benzoyl-sec-butyl-amino)-4-nitrobenzene, and the like, may also be prepared.

The new dyestuffs are particularly useful for dyeing animal fibers. They are distinguished from the analogous dyestuffs not containing the following group:

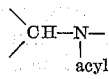

in their diazo-component partly by clear more yellowish shades and partly by an increased levelling power.

Example 1

19.2 parts of 1-(N-acetyl-isopropylamino)-4-aminobenzene are diazotized in the usual manner and the diazo solution obtained is allowed to run into a solution of 32 parts of 2-naphthol-6.8-disulfonic acid containing an excess of sodium carbonate. The dyestuff thus obtained of the formula:

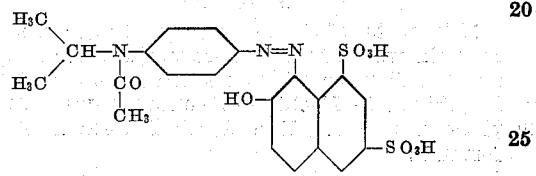

is isolated and dried. It forms a bright orange colored powder, soluble in water, dyeing wool and silk bright yellowish orange shades of good fastness to washing and light and of good levelling power.

By employing instead of the 2-naphthol-6.8-disulfonic acid other naphthol-mono-or-disulfonic acids such as per example 1-naphthol-4-sulfonic acid, 1-naphthol-3-sulfonic acid, 2-naphthol-6-sulfonic acid, 1-naphthol-3.6-disulfonic acid or 1-naphthol-3.8-disulfonic acid dyestuffs are obtained which yield similar orange to yellowish red shades of likewise good levelling power.

Example 2

25.4 parts of 1-(N-benzoyl-isopropylamino)-4-aminobenzene are diazotized in the usual manner and the diazo solution obtained is allowed to run into a solution of 37 parts of 1-acetylamino-8-naphthol-3.6-disulfonic acid containing an excess of sodium carbonate. When the combination is complete the dyestuff formed of the formula:

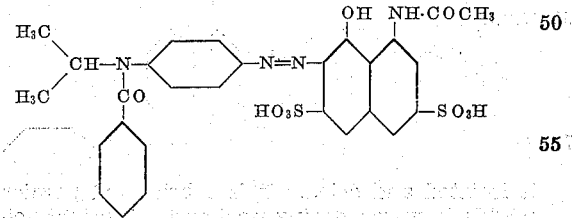

is separated and dried. It is a dark red powder, soluble in water, dyeing wool and silk bright bluish red shades of good levelling power and good fastness to fulling, light, seawater and perspiration.

Dyestuffs of similar shades and fastness properties are obtained by replacing the said diazo component by the corresponding amounts of 1-(N-acetyl-isopropylamino)-4-aminobenzene, 1-(N-acetyl-isopropylamino)-3-aminobenzene, 1-(N-methoxyacetyl-isopropyl-amino)-4-aminobenzene, 1-(N-acetyl-isopropylamino)-4-aminobenzene-2-sulfonic acid or of analogous amines which may contain any other acyl radicle.

By combining 1-(N-acetyl-isopropylamino)-4-aminobenzene-2-sulfonic acid with 2-amino-8-naphthol-6-sulfonic acid in a medium containing a mineral acid a dyestuff is obtained which dyes wool bright red shades of good levelling power and excellent fastness to light.

Example 3

19.2 parts of 1-(N-acetyl-isopropylamino)-4-aminobenzene are diazotized in the usual manner and the diazo solution obtained is combined with 37 parts of 1-acetylamino-8-naphthol-4.6-disulfonic acid. The dyestuff formed of the formula:

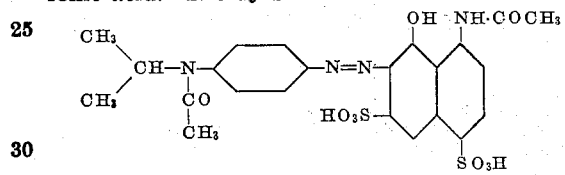

is isolated and dried. It is a dark red powder, soluble in water, dyeing wool and silk bright red shades of good levelling power and fast to light.

Example 4

19.2 parts of 1-(N-acetyl-isopropylamino)-4-aminobenzene are diazotized in the usual manner and the diazo solution obtained is combined with 26 parts of 1-(2'-chloro-5'-sulfophenyl)-3-methyl-5-pyrazolone. The dyestuff formed of the formula:

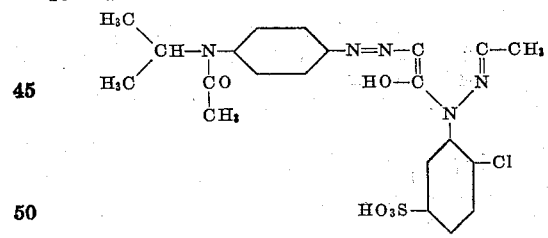

is when dry a lemon-yellow powder, soluble in water, dyeing wool and silk bright greenish yellow shades of very good levelling power and fast to washing and light.

Example 5

20.6 parts of 1-(N-acetyl-sec-butylamino)-4-aminobenzene are diazotized in the usual manner and the diazo solution obtained is allowed to run into a solution of 36 parts of 1-benzoylamino-5-naphthol-7-sulfonic acid containing an excess of sodium acetate. When the combination is complete the dyestuff formed of the formula:

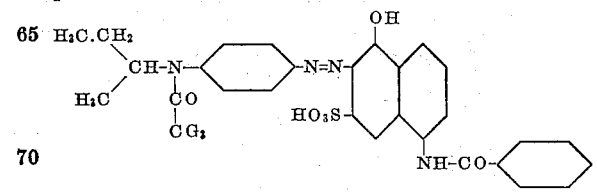

is isolated and dried. It is a brick-red powder, soluble in water, dyeing wool and silk bright yellowish red shades of very good levelling power and good fastness especially to light.

The dyestuff formed by employing 2-benzoylamino-5-naphthol-7-sulfonic acid as coupling component represents a yellowish red powder, soluble in water, dyeing wool and silk bright orange shades of similar fastness properties.

Example 6

26.8 parts of 1-(N-benzoyl-sec-butylamino)-4-aminobenzene are diazotized in the usual manner and the diazo solution obtained is allowed to run at about 10–15° C. into a solution of 29 parts of 2-acetylamino-8-naphthol-6-sulfonic acid containing an excess of sodium acetate or sodium bicarbonate. When the combination is complete the dyestuff formed of the formula:

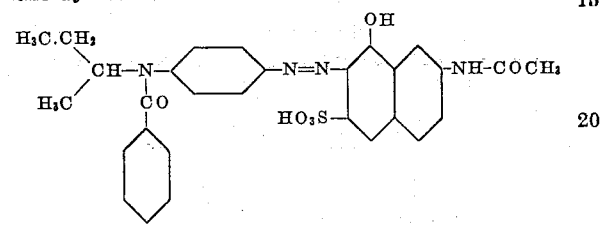

is isolated and dried. It is a red powder, soluble in water, dyeing wool and silk bright red shades of good levelling power and good fastness to fulling, light and perspiration.

Dyestuffs of similar properties are obtained by employing other diazo components such as for example 1-(N-benzenesulfo-sec-butylamino)-4-aminobenzene or 1-(N-p-toluenesulfo-isopropylamino)-4-aminobenzene.

There may be used as coupling components derivatives of 2-amino-8-naphthol-6-sulfonic acid, 1-amino-8-naphthol-6-sulfonic acid, 1-amino-5-naphthol-7-sulfonic acid or 2-amino-5-naphthol-7-sulfonic acid containing other acyl radicles such as for example the methoxyacetyl, chloroacetyl, carbethoxyacetyl, benzoyl, hexa-hydro-benzoyl and phenoxyacetyl radicle and derivatives thereof substituted in the benzene nucleus. Furthermore, the acylamino-naphthalene-sulfonic acids employed as coupling components may contain in their acylated amine group aliphatic, hydroaromatic or aromatic radicles, by which the shades and properties of the dyestuffs obtained are changed.

I claim:

1. The monoazo dyestuffs of the general formula:

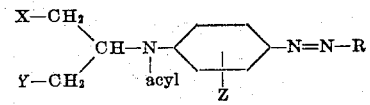

wherein X and Y stand for members selected from the group consisting of hydrogen and methyl, acyl stands for an acyl radicle of the aliphatic and benzene series, Z stands for a member selected from the group consisting of hydrogen and —SO$_3$H, and R means the radicle of a coupling component, which dyestuffs yield on fibers, especially wool and silk, clear yellow to yellowish red shades of good fastness properties and of very good levelling power.

2. The monoazo dyestuff of the formula:

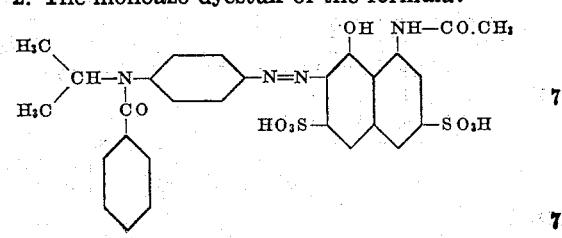

which dyestuff represents a dark red powder, soluble in water, dyeing wool and silk bright bluish red shades of good levelling power and good fastness to fulling, light, seawater and perspiration.

3. The monoazo dyestuff of the formula:

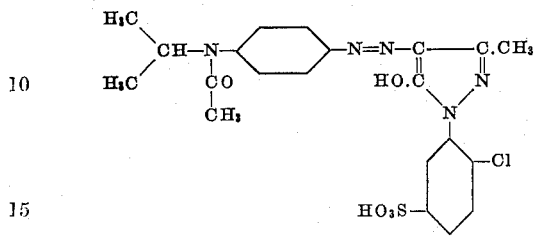

which dyestuff represents a lemon-yellow powder, soluble in water, dyeing wool and silk bright greenish yellow shades of very good levelling power and fast to washing and light.

4. The monoazo dyestuff of the formula:

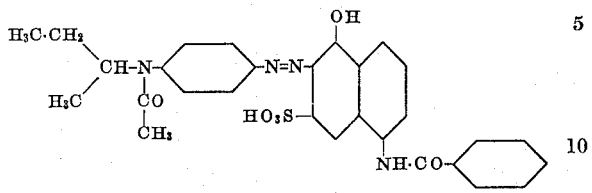

which dyestuff represents a brick-red powder, soluble in water, dyeing wool and silk bright yellowish red shades of very good levelling power and good fastness especially to light.

RICHARD FLEISCHHAUER.